Jan. 25, 1949.    R. P. SCHERER ET AL    2,460,039
HYPODERMIC SYRINGE

Filed April 14, 1944    2 Sheets-Sheet 1

INVENTOR.
Robert P. Scherer &
BY  John Otto Scherer
Parker & Burton
attorneys

Jan. 25, 1949.  R. P. SCHERER ET AL  2,460,039
HYPODERMIC SYRINGE
Filed April 14, 1944  2 Sheets-Sheet 2

INVENTOR.
Robert P. Scherer &
BY John Otto Scherer
Parker & Burton
attorneys

Patented Jan. 25, 1949

2,460,039

UNITED STATES PATENT OFFICE 2,460,039

HYPODERMIC SYRINGE

Robert P. Scherer and John Otto Scherer, Detroit, Mich., assignors, by mesne assignments, to R. P. Scherer Corporation, a corporation of Michigan Application April 14, 1944, Serial No. 531,044

5 Claims. (Cl. 128—218)

This invention relates to an improved hypodermic syringe.

An object is to provide a hypodermic device adapted particularly to be used to administer a single hypodermic injection, and to thereafter be thrown away. Such a hypodermic device is primarily intended for use by the patient, or one other than a physician. It is peculiarly suited for use by members of the Armed Forces.

A further object is to provide such a device which is simple, sturdy, inexpensive and effective for the purpose intended and which is adapted to withstand rough usage, such as an instrument might receive if carried by soldiers in the field.

Another object is to provide such a device wherein the needle and the medicament solution to be injected is kept sterile until the device is put into use and sterilization at time of use is not necessary.

More specifically, an object is to provide a hypodermic device comprising a tubular body having a piston slidably mounted therein and forming a seal between the rear end portion of the body, which rear end portion contains the medicament solution, and the forward end portion of the body which houses a double ended holow hypodermic needle and wherein the forward end portion of the body is closed by a puncturable seal and wherein pressure through the liquid upon the piston always moves the needle to puncture first through the puncturable seal and thereafter to puncture through the piston to receive the medicament from the rear end portions of the body.

In the embodiment shown a plunger is movable through the rear end of a one piece tubular body to exert pressure upon the medicament, upon forward movement of the plunger, pressure is exerted upon the medicament solution and through such solution upon the piston. Means is positively actuated by the piston to positively project one end of the needle through the protective seal over the front end of the body. Continuation of pressure by the plunger upon such solution causes the opposite end of the needle to puncture through the piston and permit the hypodermic solution to be ejected through the needle.

The construction is such that the needle is positively projected by the piston from its housing to a position of use before it is permitted to puncture through the piston to receive the hypodermic solution. The needle is projected a limited distance and is then held at such projected position against further movement, or against accidental withdrawal upon release of pressure upon the solution and piston.

More specifically means is provided intervening the piston and needle which, upon initial forward movement of the piston, positively projects the needle through the puncturable seal to a position of use. Such means may be a spring device, which couples the needle to the piston to advance with the piston a limited distance, but which releases the needle or piston following limited joint advance thereof and permits relative movement of the needle and piston whereby the rear end of the needle is caused to puncture through the piston to receive medicament. Such means may be a part which is puncturable but substantially more resistant to puncture than the seal over the forward end of the body.

Other objects, advantages and meritorious features will more particularly appear from the following description, appended claims and accompanying drawings, wherein:

Figure 1:
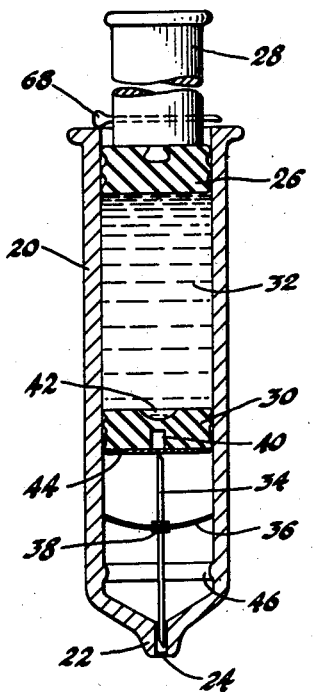
Fig. 1 is a longitudinal sectional view through a device embodying the invention wherein the needle occupies a position of non-use.
Figure 2:
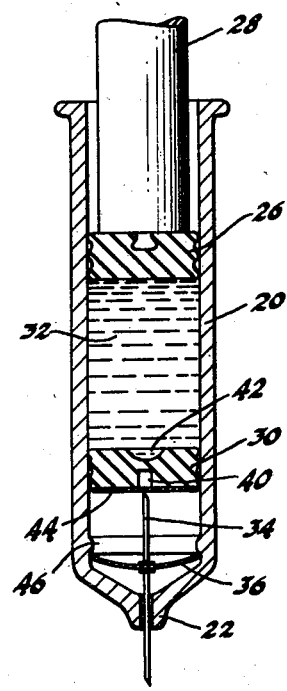
Fig. 2 is a longitudinal sectional view through a device similar to Fig. 1, and wherein the needle has been projected forwardly to a position of use but has not punctured the piston to receive hypodermic solution.
Figure 3:
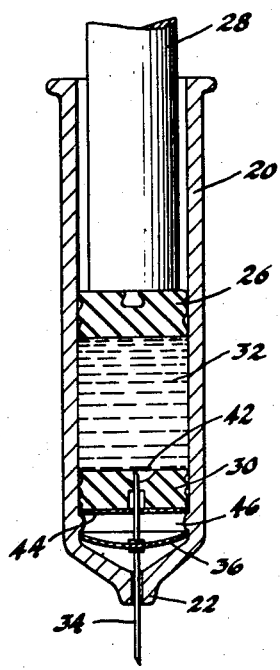
Fig. 3 is a cross sectional view on the same line as Fig. 2, showing the needle projected through the piston to receive the solution.

This improved hypodermic device comprises a tubular body portion 20, which may be formed of transparent plastic, or any other suitable material. The body is closed at one end, except for a needle opening 22, which opening is normally sealed by a puncturable flash or seal 24 of plastic or other suitable material. The opposite end of the body is open to receive the plunger assembly as shown in the drawings and includes a plunger head 26 and a plunger rod 28. In Figs. 1 through 3 this rod is shown as coupled with the plunger to actuate it in opposite directions.

A piston 30, which may be formed of rubber, or other suitable material, is slidably disposed within the interior of the body, and seals the forward end portion of the body, which houses the needle, from the rear end portion of the body which contains hypodermic solution 32. The piston 30 and the plunger 26 form fluid tight seals with the wall of the body tube.

Housed within the interior of the body, ahead of the piston 30, is a double ended hollow hypodermic needle 34. As shown in Figs. 1 through 3 there is secured upon the needle 34 a supporting spring spider 36. This spider may be held fixed in place on the needle by spaced lugs 38 formed thereon as shown in Figs. 1 through 3.

The forward end of the needle is shown as freely slidably received within the opening 22 in the end of the body. It is normally withdrawn away from the puncturable seal 24 as shown in Fig. 1. The rear end of the needle is disposed opposite a portion of the piston, which portion is of reduced thickness through being cut away as at 40 and 42. A puncturable disc of plastic, or other suitable material 44 is shown in Figs. 1 through 3 as interposed between the rear end of the needle and the piston. Such disc is substantially more resistant to puncture than the seal 24.

The interior of the body shown in Figs. 1 through 3 inclusive, is provided adjacent to its forward end with an interiorly projecting rib 46. This rib has such dimensions that the spider 36, which is formed of resilient material, may spring over the rib to the position shown in Figs. 2 and 3, and will then retain the needle projected forwardly as shown.

Figure 4:
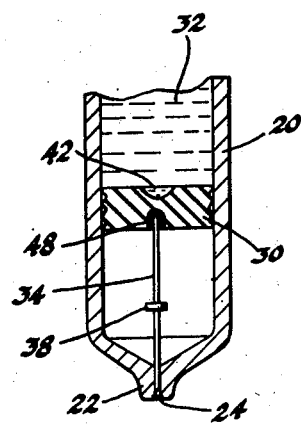
Fig. 4 is a broken away fragmentary section taken on the same line as Fig. 1, showing a slightly modified form of construction.

In Fig. 4, instead of providing a puncturable disc 44, there is provided a puncturable cup 48, which cup is seated within the recess 40 formed in the piston 30. The rear end of the needle is normally seated within the cup and the needle is held in place between the cup and the puncturable seal 24 with a close sliding fit within aperture 22. The cup is more resistant to pressure than is the seal 24, whereby initial forward movement of the piston first projects the needle to the position shown in Fig. 2, but with the abutment 38 against the end wall of the body preventing further projection of the needle. Continued forward movement of the piston causes the needle to puncture through the cup and piston into the solution chamber as heretofore described.

Figure 5:
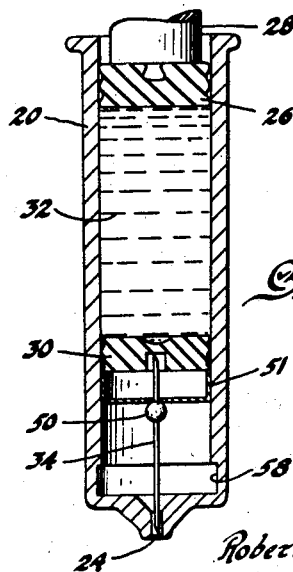
Fig. 5 is a sectional view taken on the same line as Fig. 1, and with the needle in the same position, but showing a modified embodiment.
Figure 11:
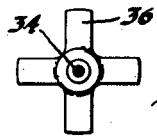
Fig. 11 is a plan of the spring spider 36 used in Figs. 1 through 4.
Figure 6:
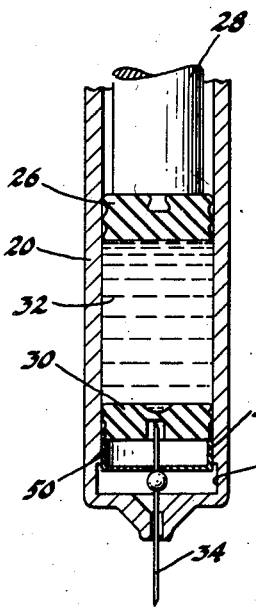
Fig. 6 is a sectional view taken on the same line as Fig. 5, and of the same structure, but showing the needle in the position it occupies after being partially advanced by the piston.
Figure 8:
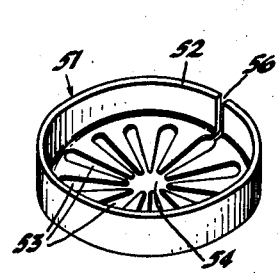
Fig. 8 is a perspective of the spring cup shown in Figs. 5, 6 and 7.
Figure 7:
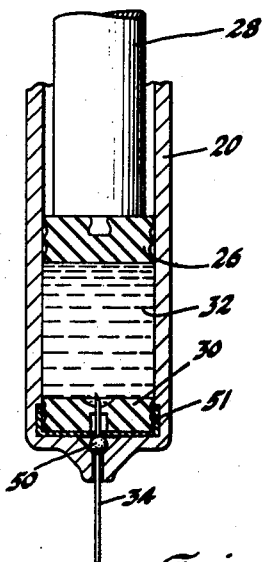
Fig. 7 is a sectional view taken on the same line as Fig. 5, and of the same structure, but showing the needle in the position it occupies for ejection of medicament.

In Figs. 5 through 7, instead of providing the puncturable disc 44 or cup 48 there is provided a spring cup 51, such as shown in Fig. 8. This cup is interposed between the piston 30 and an abutment 50 on the needle. This cup may be formed with a base provided with a plurality of slits 53 radiating outwardly from a central aperture 54 toward the side wall 52. The cup 51 is split as at 56 through the base and side wall and is sprung inwardly when received within the interior of the body, and the side wall 52 bears resiliently against the side wall of the body forming a sliding fit therewith. In operation the plunger moves the piston 30 forwardly from the position shown in Fig. 5, through the position shown in Fig. 6 to the position shown in Fig. 7 and the cup 51 is urged along ahead of the piston and with the cup the needle 34 is also moved forwardly through the seal 24.

The body, shown in Figs. 5, 6, 7 and 9, is cut away interiorly at 58 adjacent to its front end, forming a circumferential recess of sufficient depth to receive the cup 51 therein as shown in Fig. 7. When the cup is received within this recess, it expands because of its inherent spring tension and permits the piston 30 to enter the cup. As the piston enters the cup, the rear end of the needle, due to pressure of the piston thereon, is projected through the piston, as shown in Fig. 7 to permit the ejection of the solution therethrough.

Figures 9, 13:
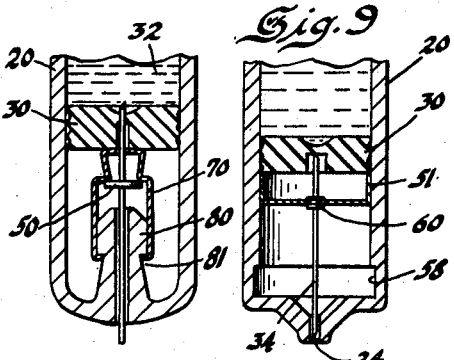
Fig. 9 is a fragmentary sectional view showing one method of securing the cup of Fig. 8 on the needle.
Fig. 13 is a fragmentary sectional view of the structure of Fig. 12 showing the spring means advancing to release the needles.

In Fig. 9, instead of providing the ball abutment 50 as shown in Figs. 5, 6 and 7, a pair of spaced abutments 60 are provided similar to those shown in Figs. 1 through 3 which positively secure the spring cup to a determined position on the needle, and thereby prevent the needle being accidentally jarred by rough handling of the device and puncturing through the seal 24.

Figure 10:
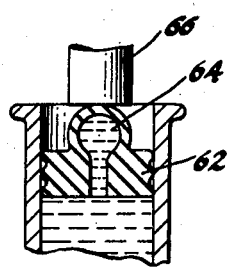
Fig. 10 is a fragmentary sectional view showing a modified form of plunger.

Fig. 10 shows a plunger head 62, which is provided with an interior recess 64 of a generally ball shaped configuration. A separate rod 66 may be used to project this plunger head forwardly. It is apparent that pressure on the ball portion of the plunger head will compress the same so that upon release of pressure, a suction will be imposed upon the solution within the body for a purpose hereinafter set forth.

Figure 12:
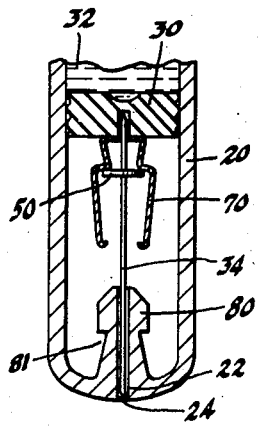
Fig. 12 is a fragmentary sectional view taken on the same line as Fig. 12 showing a modified form of spring connection between the piston and needle.

In Figs. 12 and 13 there is shown another embodiment of the invention. In this embodiment the spring means which intervenes the needle and piston is adapted upon reaching a determined position within the body following projection of the needle through the puncturable seal 24 to release the needle to puncture through the piston. In the construction heretofore described, and shown in Figs. 5, 6 and 7, the piston is released to slide over the needle. In both embodiments the spring coupling acts to first positively project the needle and piston as a unit for the desired limited distance and thereafter to permit relative movement of the piston and needle to puncture the piston.

In this embodiment of Figs. 12 and 13, there is a tubular body 20 having a needle opening 22 closed by a puncturable seal 24. Piston 30 is slidably disposed within the body sealing the needle containing compartment ahead of the piston from the solution containing compartment to the rear of the piston. A double ended hypodermic needle 34 is movably positioned within the forward end portion of the body. This needle is provided with a stop 50. This is all as has been heretofore described in connection with the structure shown in Figs. 1 through 9.

Figure 14:
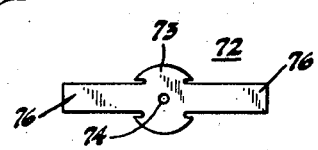
Fig. 14 is a plan of the blank from which the spring means of Fig. 13 is formed.

In this embodiment of Figs. 12 and 13, the needle is coupled with the piston to be initially advanced thereby by a spring device which differs from the cup 51 shown in Figs. 5, 6 and 7. This spring device 70 may be formed from the blank 72 shown in Fig. 14. This blank may be spring metal. The blank is bent to the shape illustrated in Figs. 12 and 13 to provide a spring clip provided with a base 73 having the needle receiving perforation 72, and the two arms 76 bent to the shape shown in Figs. 12 and 13. These arms are shaped to engage the abutment 50 on the needle to positively urge the needle forwardly to the position shown in Fig. 13.

The body is provided with an axial internal projection 80 recessed on opposite sides at 81. When the piston is advanced through pressure of a plunger upon the solution, the piston acts upon the needle through the spring clip 70 and advances the needle to the position shown in Fig. 13. Further movement of the piston will cause the spring arms 76 to spread apart and slide over the projection 80. This expansion of the spring clip permits the abutment 50 to seat against the body projection 80. Further movement of the piston will be relative to the needle and cause the needle to puncture through the piston as heretofore described in connection with the structure shown in Figs. 1 through 7 and the abutment 50 on the needle will seat against base 73 of the clip.

Figs. 1, 4, 5, 9 and 12 show the device in the inoperative position, with the needle housed within the front portion of the body, ahead of the piston, and sealed off from contamination so that it will be sterile when it is desired for use.

Fig. 1 shows a pin 68 which may be inserted through a passageway provided in the plunger handle 28 to hold the plunger against accidental displacement. When it is desired to use the device this pin would be withdrawn and the plunger 28 moved forwardly to impose pressure upon the solution 32 and thereby move the piston 30 forwardly. The initial forward movement of the piston projects the needle 34 through the puncturable seal 24 and to the position shown in Figs. 2 and 13. The difference in resistance to puncture of the seal 24 as compared with the disc 44 or the cup 48 of the structures shown in Figs. 1 through 4 produces such result. The same result is produced with the structures of Figs. 5 through 9 by the spring cup 51 being held compressed within the body to be advanced by the piston and a similar result is produced with the structure of Figs. 12 and 13 as hereinabove described.

Continued forward movement of the plunger imposes pressure through the liquid upon the piston, whereby the piston is moved over the rear end of the needle, and the needle enters the interior of the medicament compartment as shown in Fig. 3. In this position, the hypodermic solution may be ejected through the needle upon continued forward movement of the plunger. In Figs. 1 through 4, the needle is held in its projected position through the spring spider 33, having passed beyond the rib 46 as shown in Figs. 2 and 3. In Figs. 5, 6, 7 and 9 the spring cup 51 enters the recess 58 in the body and holds the needle projected. In Figs. 12 and 13 the forward ends of the arms 76 seat within recesses 81 formed in opposite sides of the projection 80. The spring spider 36 has frictional engagement with the wall of the body and supports the needle, and by virtue of its securement to the needle prevents the needle from being accidentally projected through the seal 24.

The embodiment shown in Figs. 5, 6, and 7 is similar to that of Figs. 1 through 3 except for the employment of the spring cup which has been described. This spring cup affords a positive mechanical couple between the piston and the needle, whereby the needle is positively urged forward to its projected position before it is permitted to puncture the piston. In this construction, it is not necessary to depend upon difference in resistance to pressure as it is in the structure shown in Figs. 1 through 3 to insure the needle first being projected through the seal before puncturing the piston. When the spring cup is received within the recess 53 as shown in Fig. 7, the needle is positively locked in its projected position against withdrawal. The structure of Figs. 12 and 13 functions as does the spring cup to hold the needle positively to be projected a determined distance by and with the piston.

Under certain circumstances, it is desirable to know whether a hypodermic needle has entered a vein or not, and it is possible, with the structure shown in Fig. 10, to release pressure on the plunger head 62 sufficiently to permit the needle to aspirate and withdraw blood after it has entered a vein so as to indicate such a fact.

We claim:

1. In a hypodermic syringe, a tubular device having a liquid containing rear end portion and needle containing forward end portion, a puncturable seal normally closing the forward end thereof, a piston element slidably mounted therein sealing the forward end portion from the rear end portion, a double ended hollow needle element supported within the forward end portion ahead of the piston, spring means responsive to the initial limited forward movement of the piston element to project the needle element through the puncturable seal, said spring means adapted following said limited forward movement of said elements to release one element to permit the needle to puncture the piston, and means cooperating with said spring means restraining the forward advance of the needle beyond a limited distance.

2. In a hypodermic syringe, a tubular body having a liquid containing rear end portion and a needle containing forward end portion, a puncturable piston slidably mounted within the body sealing the forward end portion from the rear end portion, a double ended hollow needle movably supported within the forward end portion ahead of the piston, an expansible spring cup intervening the piston and needle to cause the needle to advance upon limited advance of the piston, said spring cup adapted to expand upon limited advance to permit the piston to be advanced thereinto over the needle.

3. In a hypodermic syringe, a tubular body having a liquid containing rear end portion and a needle containing forward end portion, a puncturable piston slidably mounted within the body sealing the forward end portion from the rear end portion, a double ended hollow needle movably supported within the forward end portion ahead of the piston, an expansible spring clip intervening the piston and needle to cause the needle to advance upon limited advance of the piston, said spring clip adapted to be expanded upon limited advance to permit the piston to be advanced thereinto over the needle.

4. In a hypodermic syringe, a tubular body having a liquid containing rear end portion and a needle containing forward end portion, a puncturable seal closing the forward end of the body, a needle puncturable piston slidably mounted within the body sealing the forward end portion from the rear end portion, a double ended hollow needle movably supported within the forward end portion of the body ahead of the piston, spring means coupling the needle with the piston to cause the needle to be advanced by the piston to puncture through said puncturable seal, a part within the body adapted to act upon the said spring means during its advance to release the piston and needle for relative movement to permit the needle to puncture through the piston.

5. In a hypodermic syringe, a tubular body having a liquid containing rear end portion and a needle containing forward end portion, a puncturable piston slidably mounted within the body sealing the forward end portion from the rear end portion, a double ended hollow needle movably supported within the forward end portion ahead of the piston, an expansible spring member intervening the piston and needle to advance the needle upon initial limited advance of the piston, said spring member adapted to be expanded following said limited advance of the needle to permit the piston to advance over the needle for puncturing thereby.

ROBERT P. SCHERER.
JOHN OTTO SCHERER.

REFERENCES CITED

The following references are of record in the file of this patent:

UNITED STATES PATENTS

| Number | Name | Date |
| --- | --- | --- |
| 766,203 | Walsh | Aug. 2, 1904 |
| 1,767,304 | Morton | June 24, 1930 |